United States Patent Office 3,338,674
Patented Aug. 29, 1967

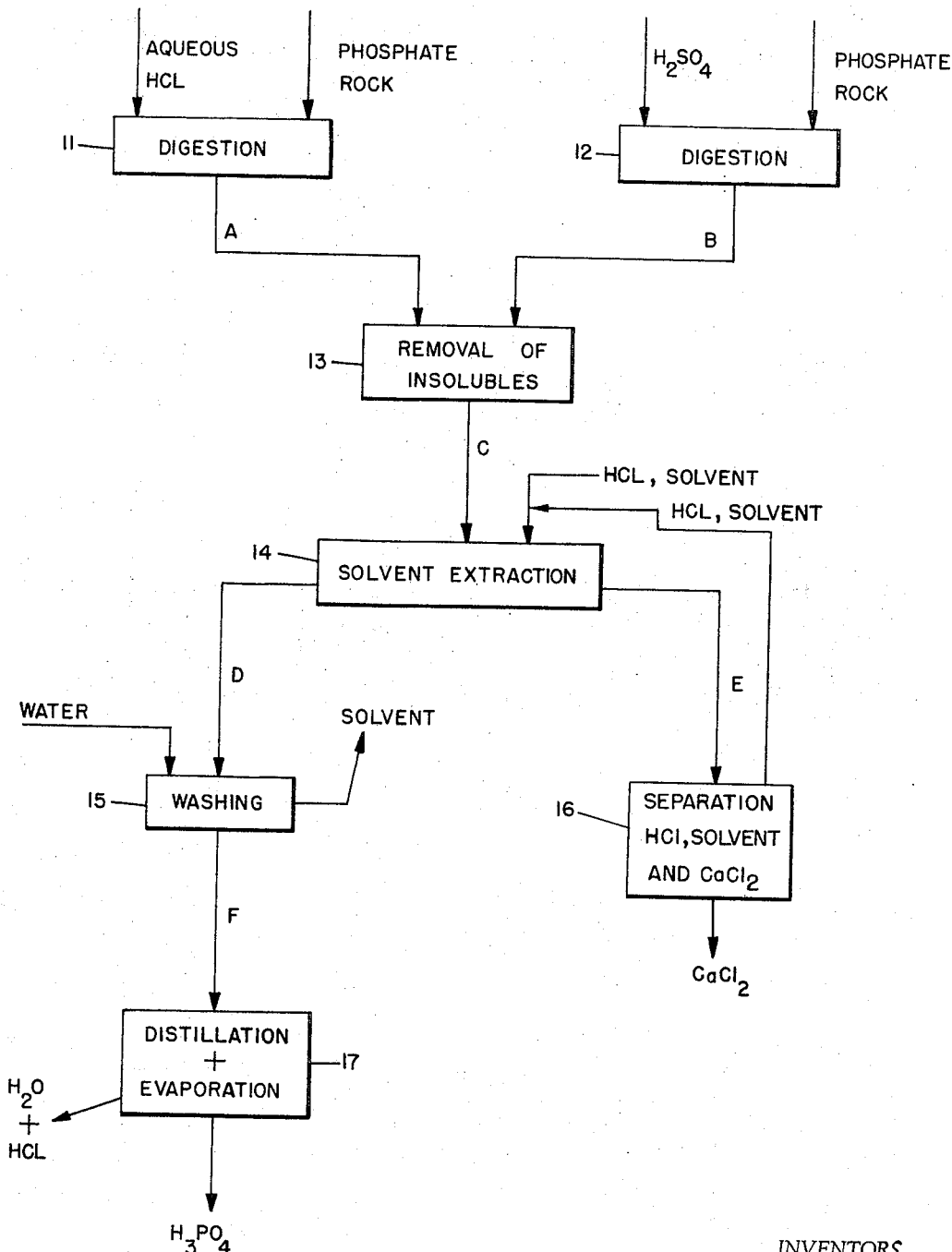

3,338,674
PROCESS FOR PREPARATION OF SUBSTANTIALLY PURE PHOSPHORIC ACID
Avraham M. Baniel, 28 Horeb St., Haifa, Israel; Ruth Blumberg, 25 Vitkin St., Mount Carmel, Haifa, Israel; and Alexander Alon, 16a Tel-Maneh, Ahuza, Haifa, Israel
Filed May 9, 1963, Ser. No. 279,156
5 Claims. (Cl. 23—165)

The present invention relates to a process for the preparation of phosphoric acid. More particularly, it is directed to a process for producing phosphoric acid by treatment of calcium phosphate-containing material with sulfuric acid and with hydrochloric acid and solvent extraction of phosphoric acid from the resulting aqueous reaction mixture or mixtures.

Until recently, sulfuric acid was the only mineral acid used in a reaction with a calcium phosphate-containing material for the production of phosphoric acid. However, the so-called "wet-process" phosphoric acid produced by this method contains substantial amounts of impurities, such as fluorine, arsenic, calcium, iron, aluminum, lead and other metals and, therefore, the resulting acid has very limited uses. For this reason, phosphoric acid produced by conventional sulfuric acid wet-process methods is used primarily in the manufacture of fertilizer materials in which purity is not a primary consideration. If such wet-process phosphoric acid is to be used in foods or high-grade chemical products, it must be purified. Conventional purification of wet-process phosphoric acid involves a number of tedious and costly precipitation and filtration operations, such as, for example, partial neutralization of the acid with lime and the formation of phosphate precipitates. However, the product obtained from these processes even after costly purification procedures are resorted to does not, in many instances, meet the specification requirements for chemicals for food and pharmaceutical use. For these reasons, then, industry's needs for a high-purity product has been supplied by phosphoric acid produced by the thermal reduction process. Since hydrochloric acid is available in many localities as a waste or by-product where its economical utilization is often mandatory for expansion of the parent industry, the inclusion of hydrochloric acid as a raw material in phosphoric acid production is very important.

The first commercially feasible process for the production and recovery of phosphoric acid utilizing waste hydrochloric acid was disclosed by Baniel and Blumberg in U.S. Patent 2,880,063. This patent discloses a process wherein phosphate rock is reacted with aqueous hydrochloric acid to form an aqueous reaction mixture comprising phosphoric acid and calcium chloride. Phosphoric acid is extracted from the aqueous reaction mixture by contacting said mixture with a lower aliphatic alcohol or ketone. The aqueous extract is separated from the solvent extract, the solvent extract washed with water to release the acid, and the aqueous phosphoric acid is concentrated.

The present invention is an improvement over the above referred to Baniel and Blumberg process. Although the process of the foregoing patent has proved to be fairly satisfactory, it is subject to considerable improvement, particularly in the direction of getting higher concentrations of extractable phosphoric acid in the aqueous reaction mixture resulting from reaction of aqueous hydrochloric acid and phosphate rock. It is most desirable to obtain as high a concentration as possible of organic solvent extractable $P_2O_5$ in the aqueous reaction mixture formed by the reaction of phosphate rock on a mineral acid, for the reason that the higher the concentration of extractable $P_2O_5$ in the aqueous mixture, the more economical it is to extract and concentrate the resulting acid; this is because the volume of fluid to be processed is reduced considerably and, therefore, the distillation and evaporation apparatus can be much smaller.

Up until now the manufacture of substantially pure, food-grade phosphoric acid by procedures utilizing solvent extraction of reaction mixtures resulting from treatment of phosphate rock and hydrochloric acid has involved use of hydrochloric acid as the sole acid reactant. The present invention provides a method wherein a combination of mineral acids, namely, hydrochloric acid and sulfuric acid, are used to produce an extractable phosphoric acid slurry from which high-quality phosphoric acid is obtained, provided that certain amounts of hydrochloric acid and sulfuric acid are used in the process. Since waste hydrochloric acid may not always be readily available in quantities sufficient to fully meet the needs of a process requiring only hydrochloric acid, our process—in which sulfuric acid provides part of the acid requirement—has greater flexibility and stability than the above referred to Baniel and Blumberg process.

Accordingly, an object of this invention is to provide a method for the production and recovery of substantially pure phosphoric acid.

Another object of the invention is to provide a method for producing high concentrations of readily extractable phosphoric acid in an aqueous reaction mixture.

A further object of the invention is to provide an improved wet-process method for the production of phosphoric acid of high purity.

A still further object of the invention is to provide a process that substantially reduces the evaporation and distillation load requirements necessary to produce concentrated phosphoric acid.

Various other objects and advantages will appear from the following description of the invention and the novel features will be particularly pointed out hereinafter in connection with the appended claims.

We have found, in accordance with our invention, that if a calcium phosphate-containing material is reacted with hydrochloric acid and sulfuric acid, which acids are in a certain ratio range to each other and to the phosphate-containing material, that an aqueous reaction mixture containing a high concentration of organic solvent extractable phosphoric acid is obtained.

Calcium phosphate-containing material can be (a) reacted with a mixture of hydrochloric and sulfuric acids in one vessel, or (b) each acid may be reacted with phosphate-containing material in a separate vessel and the resulting aqueous reaction mixtures blended. In either case, the aqueous reaction mixture resulting from either (a) or (b) above is contacted with a suitable organic solvent to extract phosphoric acid, the acid is removed from the solvent by washing with water, and the phosphoric acid then concentrated by distillation.

The amounts of hydrochloric acid and sulfuric acid used in the dissolution of the phosphate-containing material are important. The aqueous reaction mixture which results from reacting said phosphate material with the acids must contain certain quantities of calcium chloride and phosphoric acid in order that the phosphoric acid can be selectively extracted by means of a suitable organic solvent. We have found that the amount of calcium chloride present in the aqueous reaction mixture governs the extraction of $P_2O_5$ at any specific concentration of $P_2O_5$. Excessive amounts of calcium chloride in the aqueous reaction mixture limits the working concentration of $P_2O_5$ and results in the formation of a viscous unmanageable mass that is extremely difficult to process for the recovery of phosphoric acid. For example, when phosphate rock is reacted with hydrochloric acid to result in a concentration of more than 125 grams per liter of $P_2O_5$ in the aqueous reaction mixture, then the reaction mixture cannot be successfully treated with an organic solvent for recovery of phosphoric acid.

We have discovered that with a lowering of the calcium chloride concentration one can raise the $P_2O_5$ concentration of the resulting aqueous reaction mixture when utilizing both hydrochloric and sulfuric acids to acidulate a phosphate-containing material. Concentrations of $P_2O_5$ of the order of 125 to 300 grams per liter in the aqueous reaction mixture can be readily extracted, and concentrated phosphoric acid recovered following the procedure of the instant invention.

We prefer to react the phosphate-containing material with about a 30% hydrochloric acid solution although higher, as well as lower concentrations can, of course, be used. Likewise, the concentration of sulfuric acid is not critical and it may be, for example, between 25%–98%, although concentrated sulfuric acid is preferred.

The calcium phosphate-containing material that is used in the process may be phosphate rock and minerals or ores wherein calcium phosphate is associated with other compounds, such as calcium fluoride. If phosphate rock is used, it may be uncalcined or calcined. Low grade ore can be used although high grade ores are obviously preferred. Ores containing about 30% to 35% $P_2O_5$ are generally used.

We have found that the amount of sulfuric acid that is used to react with a calcium phosphate-containing material must be from about 75 to 25 equivalent percent and the balance, hydrochloric acid, must be from about 25 to 75 equivalent percent. By this, it is meant from 75 to 25 percent of the total acid requirement necessary to convert the phosphate material to phosphoric acid is supplied by sulphuric acid, and the remaining 25 to 75 percent is supplied by hydrochloric acid.

Organic solvents suitable for extracting phosphoric acid from the aqueous reaction mixture are those that are capable of dissolving concentrated phosphoric acid but which have limited miscibility with water with or without dissolved phosphoric acid and calcium chloride. The particular solvent used in the process may be ascertained by reference to data on the mutual miscibility of solvents and water, which is well-known in the art and is available from the literature, e.g., Seidell, Solubilities of Organic Compounds, 3rd Edition, vol. II, 1941, D. Van Nostrand Co., Inc., New York, N.Y., and Landolt-Bornstein, Physikalisch-Chemische Tabellen, 1912, Julius Springer, Berlin, Germany. Representative solvents coming within the above definition are, for example, lower aliphatic alcohols and ketones of limited mutual miscibility with water, such as alcohols containing four to six carbon atoms in the aliphatic group, used alone or in mixtures, e.g., butanol, amyl alcohol, isoamyl alcohol, and also, trialkyl phosphates, particularly those containing two to eight carbon atoms in the individual alkyl groups, such as tributyl phosphate and mixtures thereof.

Reference is now made to the drawing, showing for the purpose of illustration, a flow sheet representative of the procedure for treating phosphate rock to obtain aqueous phosphoric acid.

Phosphate rock and aqueous hydrochloric acid are fed to a digestor and reacted, as indicated at 11. Phosphate rock and sulfuric acid are likewise fed to a separate digestor and reacted, as indicated at 12.

It should be noted that dissolution of the rock may also be accomplished in a single vessel. However, if phosphate rock dissolution is performed in the same vessel, separate streams of hydrochloric acid and sulfuric acid are directed simultaneously into the vessel containing the rock or, alternatively, a stepwise addition of acids is possible. In the latter case, sulfuric acid is directed into the digestor containing the phosphate rock followed by the addition of hydrochloric acid to the same vessel. The hydrochloric acid may be added any time after the addition of the sulfuric acid. The order of addition of mineral acids to phosphate rock is not critical, and such addition may, in fact, be reversed.

Referring again to the flow sheet the aqueous reaction mixtures indicated at lines A and B, formed from the reaction of the acids on the phosphate rock, are subjected to a solids removal step indicated at 13, the solids removal being effected by filtration or countercurrent decantation, using a mud settler, and the like. If a mud settler is used for solids removal, then the solid, insoluble material in the digestion vessel drops to the bottom of the vessel. The underflow can either be filtered or washed in a countercurrent decantation system. Mud settling, filtration or countercurrent decantation are not necessary for the opperation of the process because solid insoluble particles that are carried in the aqueous reaction mixture do not seriously interfere with the subsequent liquid-liquid solvent extraction operation of phosphoric acid. However, economically it is beneficial to filter and recirculate the material coming from the mud settler.

In any event, the aqueous reaction mixture C (represented as solids-free on the flow sheet) is subjected to a solvent extraction step for the recovery of phosphoric acid. At this point, the aqueous reaction mixture contains primarily phosphoric acid and calcium chloride.

The solvent extraction step 14 can be effected through use of a series of mixer-settlers, or any suitable liquid-liquid extraction apparatus, with the aqueous reaction mixture C being contacted countercurrently with an organic solvent for the phosphoric acid in the presence of hydrochloric acid. The hydrochloric acid may be present in the organic solvent, or said acid may be added directly to the aqueous reaction mixture. In any event, free hydrochloric acid is present in the system during the extraction of phosphoric acid into the solvent. In this step phosphoric acid substantially free of impurities, together with part of the hydrochloric acid, passes from the aqueous phase into the solvent phase, while the calcium chloride and the balance of the hydrochloric acid remain in the aqueous phase. The aqueous phase is separated from the solvent phase and said solutions are now termed, respectively, the aqueous raffinate E and the solvent extract D. Hydrochloric acid is removed from the aqueous raffinate E by a second solvent extraction operation, preferably using the same organic solvent as that employed to extract phosphoric acid. The solvent and recovered hydrochloric acid are reused in the system. A minor amount of solvent remains in the aqueous calcium chloride solution, and this solvent can be recovered therefrom by steam stripping the solution.

As pointed out above, the solvent extract D contains phosphoric acid and hydrochloric acid. This extract is subjected to a water washing step, as shown at 15, and phosphoric acid and hydrochloric acid are transferred to the aqueous media and the solvent separated. The aqueous acids, phosphoric and hydrochloric, are separated and concentrated by distillation and evaporation, as shown at 17. The hydrochloric acid recovered may be recirculated to the solvent storage tank for reuse in the process. Phosphoric acid having a concentration of about 90% is recovered.

It is apparent that the specific process described above in connection with the flow sheet is subject to numerous modifications, and in order to further illustrate the nature of the invention, the following examples may be taken as illustrative and not by way of limitation thereof.

*Example 1*

1112 mls. of a 27% aqueous HCl solution (wt. percent or 9.37 equivalents) was added to 498 grams of calcined phosphate rock containing 35% $P_2O_5$ in a digestor. The rock dissolved rapidly and after 30 minutes of stirring 1340 mls. of the aqueous reaction mixture contained 130 grams per liter $P_2O_5$ and 384 grams per liter $CaCl_2$.

In a separate digestor vessel, 254 mls. of concentrated $H_2SO_4$ (9.54 equivalents) and 500 grams of calcined phosphate rock suspended in recycle wash water, containing 35% $P_2O_5$ were mixed together until reaction was substantially complete. A 30% $P_2O_5$ concentration of acid was obtained in the aqueous reaction mixture.

The two aqueous reaction mixtures were combined, and after filtration to remove solids, the resulting liquid contained 160 grams per liter $P_2O_5$ and 236 grams per liter $CaCl_2$.

This aqueous reaction mixture was extracted countercurrently with a solution containing 3200 grams of isoamyl alcohol, 320 grams of water and 160 grams HCl. The phosphoric acid was extracted into the alcoholic solvent along with part of the HCl present in the system. The solvent phase containing $H_3PO_4$ and HCl was separated from the aqueous phase containing $CaCl_2$ and HCl. HCl was recovered from the aqueous phase by distillation.

The solvent extract containing $H_3PO_4$ and HCl was washed with water and the acids passed into the aqueous media. The isoamyl alcohol was separated from the aqueous phase.

The aqueous extract contained $H_3PO_4$ (250 grams per liter $P_2O_5$), hydrochloric acid and some residual solvent. The components of the extract were separated by distillation and evaporation. 95% $H_3PO_4$ was obtained.

*Example 2*

900 mls. of a 32% aqueous HCl solution was added to 1000 grams of phosphate rock containing about 35% $P_2O_5$ and stirred for 30 minutes. 260 mls. of concentrated $H_2SO_4$ diluted with 450 mls. of water was added to the phosphate rock reaction mixture, and the stirring continued for 1 hour. The resulting aqueous reaction mixture was filtered to remove solid insoluble particles; it contained about 217 grams per liter $P_2O_5$.

The aqueous reaction mixture was extracted countercurrently and concentrated $H_3PO_4$ recovered using the same procedure as described in Example 1, except that 3000 grams of aqueous butanol was used in place of isoamyl alcohol and the alcohol contained 160 grams of hydrochloric acid and 320 grams of water.

What is claimed is:

1. A process for the preparation of substantially pure phosphoric acid which comprises reacting a calcium phosphate containing material selected from the group consisting of phosphate rock and minerals containing calcium phosphate with from 25 to 75 equivalent percent of hydrochloric acid and subsequently adding to the resultant mixture a modifying substance selected from the group consisting of from 75 to 25 equivalent percent of sulfuric acid and the reaction product of sulfuric acid and an additional quantity of the calcium phosphate containing material entering the first reaction mixture to produce an aqueous reaction mixture containing calcium chloride and phosphoric acid, the latter being present in said aqueous mixture in a concentration equivalent to about 125 to 300 grams per liter of $P_2O_5$, removing solid insoluble materials from said aqueous reaction mixture, extracting phosphoric acid from said aqueous reaction mixture in the presence of free hydrochloric acid with an organic solvent capable of dissolving phosphoric acid but having limited miscibility with water free of phosphoric acid as well as water containing phosphoric acid and calcium chloride, separating the organic solvent phase from the aqueous phase and recovering concentrated phosphoric acid from the organic solvent phase.

2. The process according to claim 1 wherein the calcium phosphate-containing material is phosphate rock.

3. The process according to claim 1 wherein the organic solvent is isoamyl alcohol.

4. The process according to claim 1 wherein the organic solvent is butanol.

5. The process according to claim 1 in which the organic solvent is selected from the group consisting of the lower aliphatic alcohols and ketones of limited mutual miscibility with water and the trialkyl phosphates having from two to eight carbon atoms in the individual alkyl groups.

References Cited

UNITED STATES PATENTS

| | | | |
|---|---|---|---|
| 1,838,431 | 12/1931 | Milligan | 23—165 |
| 1,906,386 | 2/1933 | Liljenroth | 23—165 |
| 1,929,441 | 10/1933 | Milligan | 23—165 |
| 1,929,442 | 10/1933 | Milligan | 23—165 |
| 2,049,032 | 7/1936 | Weber et al. | 23—165 |
| 2,880,063 | 3/1959 | Baniel et al. | 23—165 |
| 2,885,265 | 5/1959 | Cunningham | 23—165 |
| 2,967,825 | 1/1961 | Baniel | 23—312 X |
| 3,072,461 | 1/1963 | Long et al. | 23—165 |

FOREIGN PATENTS

| | | |
|---|---|---|
| 1,915 | 1874 | Great Britain. |
| 8,317 | 1911 | Great Britain. |
| 356,627 | 9/1931 | Great Britain. |

OSCAR R. VERTIZ, *Primary Examiner.*

O. F. CRUTCHFIELD, *Assistant Examiner.*